United States Patent
Araki et al.

(10) Patent No.: US 8,271,985 B2
(45) Date of Patent: Sep. 18, 2012

(54) SCHEDULING APPARATUS AND SCHEDULING METHOD

(75) Inventors: Kenichi Araki, Fukuoka (JP); Jun Ohtsuka, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 903 days.

(21) Appl. No.: 12/323,079

(22) Filed: Nov. 25, 2008

(65) Prior Publication Data

US 2009/0235055 A1    Sep. 17, 2009

(30) Foreign Application Priority Data

Mar. 11, 2008    (JP) .................................. 2008-061391

(51) Int. Cl.
*G06F 9/46*    (2006.01)

(52) U.S. Cl. ......... 718/102; 714/749; 370/332; 370/349

(58) Field of Classification Search .................. None
See application file for complete search history.

(56) References Cited

U.S. PATENT DOCUMENTS

| | | | |
|---|---|---|---|
| 2002/0019843 A1* | 2/2002 | Killian et al. ................. | 709/102 |
| 2003/0174791 A1* | 9/2003 | Uga .............................. | 375/340 |
| 2005/0047416 A1 | 3/2005 | Heo et al. | |
| 2005/0157759 A1* | 7/2005 | Ohno et al. ................... | 370/535 |
| 2005/0213497 A1 | 9/2005 | Cho et al. | |
| 2005/0213677 A1 | 9/2005 | Cho et al. | |
| 2005/0259623 A1* | 11/2005 | Garudadri et al. ........... | 370/335 |
| 2006/0056355 A1* | 3/2006 | Love et al. ................... | 370/332 |
| 2007/0112970 A1 | 5/2007 | Kihara et al. | |
| 2007/0168827 A1* | 7/2007 | Lohr et al. ................... | 714/749 |
| 2008/0076462 A1* | 3/2008 | Iochi et al. .................. | 455/522 |
| 2008/0212524 A1 | 9/2008 | Niwano | |

FOREIGN PATENT DOCUMENTS

| | | |
|---|---|---|
| EP | 1511245 | 3/2005 |
| EP | 1783968 | 5/2007 |
| JP | 2005-73276 | 3/2005 |
| JP | 2006-314086 | 11/2006 |
| JP | 2007-166593 | 6/2007 |
| JP | 3926354 | 6/2007 |
| JP | 2007-519363 | 7/2007 |
| JP | 2007-235932 | 9/2007 |
| WO | 2005/078964 | 8/2005 |
| WO | 2005/078965 | 8/2005 |
| WO | 2005/107311 | 11/2005 |

OTHER PUBLICATIONS

Japanese Office Action dated Apr. 17, 2012, from corresponding Japanese Application No. 2008-061391.

* cited by examiner

*Primary Examiner* — Emerson Puente
*Assistant Examiner* — Dong Kim
(74) *Attorney, Agent, or Firm* — Katten Muchin Rosenman LLP

(57) ABSTRACT

A scheduling apparatus includes a state information acquisition unit that acquires, from a decoding unit, state information that serves as an indicator for computing a processing time actually required for a decoding unit to perform a decoding process on first processing target data, and a schedule generating unit that determines a second scheduled processing time for which the decoding unit is able to perform the decoding process on second processing target data, based on the processing time computed based on the state information. The schedule generating unit further generates a second schedule for the decoding unit to perform the decoding process on the second processing target data, by allocating the second scheduled processing time to the decoding unit.

8 Claims, 9 Drawing Sheets

| TFCI Value | E-TFCI Value | Number of Repetitions |
|---|---|---|
| 50 (Initial Value) | 50 (Initial Value) | 10 (Max. Number of Repetitions) |

| TFCI Value E-TFCI Value | Data Amount [bit] |
|---|---|
| 1 | 10 |
| 2 | 20 |
| 3 | 45 |
| ... | ... |
| 50 | 10000 |

| Number of Repetitions "1" | |
|---|---|
| Data Amount [bit] | Processing Time [$\mu$ sec] |
| 10 | 23 |
| 20 | 56 |
| ... | ... |
| 10000 | 4650 |

851e

| Number of Repetitions "2" | |
|---|---|
| Data Amount [bit] | Processing Time [$\mu$ sec] |
| 10 | 28 |
| 20 | 61 |
| ... | ... |
| 10000 | 4850 |

859e

| Number of Repetitions "10" | |
|---|---|
| Data Amount [bit] | Processing Time [$\mu$ sec] |
| 10 | 33 |
| 20 | 69 |
| ... | ... |
| 10000 | 5000 |

850i

| TFCI Value | E-TFCI Value | Number of Repetitions |
|---|---|---|
| 35 | 28 | 6 |

| TFCI Value | E-TFCI Value | Number of Repetitions |
|---|---|---|
| 35 | 28 | 6 |

FIG. 7

SCHEDULING APPARATUS AND SCHEDULING METHOD

CROSS-REFERENCE TO RELATED APPLICATION(S)

This application is based upon and claims the benefit of priority of the prior Japanese Patent Application No. 2008-061391, filed on Mar. 11, 2008, the entire contents of which are incorporated herein by reference.

FIELD

The present invention relates to a scheduling apparatus that generates a schedule for a processing apparatus, based on a scheduled processing time that the processing apparatus is expected to need for data processing.

BACKGROUND

In recent years, the HSUPA (High Speed Uplink Packet Access) system defined in 3GPP (3rd Generation Partnership Project) is becoming widespread with the aim of increasing the transmission rate on an uplink channel from a radio terminal (mobile terminal) to a radio base station apparatus (Node-B) (e.g., see JP 2007-519363A, JP 2006-314086A, and Japanese Patent No. 3926354). With this HSUPA scheme, an E-DCH (Enhanced DCH) allocated separately to each of a plurality of radio terminals is provided in addition to a DCH (Dedicated Channel) allocated separately to each of the plurality of radio terminals. Increased transmission rates and enhanced throughput on uplink channels is realized by using this E-DCH.

Here, a decoding unit and a scheduling unit are provided in the above radio base station apparatus in order to decode encoded user data transmitted from a radio terminal using the above DCH or the above E-DCH. The decoding unit (processing apparatus) is constituted by a turbo decoder that performs soft-decision decoding using a MAP (Maximum a-posteriori Probability) algorithm, for example. The decoding unit thus has the function of performing error detection on a decoding result of the decoding process, and outputting the decoding result if an error is not detected in the decoding result, and feeding back the decoding result and repeating the decoding process again if an error is detected in the decoding result. That is, if an error is detected in the decoding result, the decoding unit repeats the decoding process on the user data to be processed (processing target data) up to a maximum number of repetitions.

The scheduling unit (scheduling apparatus) generates a schedule for the decoding unit by allocating a maximum scheduled processing time for which the decoding unit is able to perform the decoding process on the user data. Note that the maximum scheduled processing time is determined based on the maximum number of repetitions for which the decoding unit is able to repeatedly perform the decoding process and the maximum amount of data on which the decoding unit is able to perform the decoding process. Here, the case where the scheduling unit generates a schedule for the decoding unit for user data transmitted from a radio terminal using the above DCH (hereinafter, referred to as DCH data) and for user data transmitted from a radio terminal using the above E-DCH (hereinafter, referred to as EDCH data) will now be described.

Specifically, the scheduling unit generates a schedule for the decoding unit so as to prioritize the decoding process of EDCH data, whose decoding result needs to be notified to the radio terminal, over the decoding process of DCH data, whose decoding result does not need to be notified to the radio terminal. That is, the scheduling unit generates a schedule for the decoding unit so that the decoding process by the decoding unit is performed from the EDCH data. According to the specifications defined in 3GPP, the decoding process of EDCH data by the decoding unit is to be performed every TTI (Transport Time Interval) of an E-DCH. The scheduling unit thus generates a schedule for the decoding unit so that the decoding process of DCH data is performed between the decoding processes of EDCH data by the decoding unit. Note that, here, the TTI of an E-DCH is $2_{msec}$.

FIG. 10 illustrates an exemplary schedule for the decoding unit generated by the scheduling unit. As illustrated in FIG. 10, the scheduling unit generates a schedule for the decoding unit so that the decoding process by the decoding unit is performed from the EDCH data $U_e$. Specifically, the scheduling unit generates a schedule for the decoding unit so that the decoding process by the decoding unit is performed alternately on the EDCH data $U_e$ and the DCH data $U_d$ every $1_{msec}$. The decoding unit is thereby able to perform the decoding process on the DCH data $U_d$ and the EDCH data $U_e$ in accordance with the schedule illustrated in FIG. 10. Note that, in FIG. 10, the maximum scheduled processing time for DCH data $U_d$ is $5_{msec}$. Also, the maximum scheduled processing time for EDCH data $U_e$ is $5_{msec}$. That is, the scheduling unit has allocated a maximum scheduled processing time of $5_{msec}$ for DCH data $U_d$ and a maximum scheduled processing time of $5_{msec}$ for EDCH data $U_e$ to the decoding unit.

FIG. 11 illustrates an exemplary processing time actually required for the decoding unit to perform the decoding process on the DCH data $U_d$ and the EDCH data $U_e$, in the case where the decoding unit has performed the decoding process on the DCH data $U_d$ and the EDCH data $U_e$ in accordance with the schedule illustrated in FIG. 10. As illustrated in FIG. 11, the processing time actually required for the decoding unit to perform the decoding process on the DCH data $U_d$ is $1.8_{msec}+1.2_{msec}+0.3_{msec}=3.3_{msec}$. That is, decoding of the DCH data $U_d$ ends within the maximum scheduled processing time of $5_{msec}$ for DCH data $U_d$ allocated to the decoding unit. The processing time actually required for the decoding unit to perform the decoding process on the EDCH data $U_e$ is $0.2_{msec}+0.8_{msec}+1_{msec}+0.2_{msec}+0.3_{msec}=2.5_{msec}$. That is, decoding of the EDCH data $U_e$ ends within the maximum scheduled processing time of $5_{msec}$ for EDCH data $U_e$ allocated to the decoding unit.

That is, since the scheduling unit determines the maximum scheduled processing time based on the maximum number of repetitions for which the decoding unit is able to repeatedly perform the decoding process and the maximum amount of data on which the decoding unit is able to perform the decoding process, the decoding unit will, in the majority of cases, finish the decoding process within the maximum scheduled processing time. Thus, while the decoding unit has been reserved (secured) by the scheduling unit, the decoding unit does not perform any processing for the time (i.e., $T_a+T_b+T_c$) that there is no DCH data $U_d$ or EDCH data $U_e$ for the decoding unit to decode. Here, $T_a+T_b+T_c=0.7_{msec}+1.8_{msec}+1.7_{msec}=4.2_{msec}$. In other words, with a schedule generated by the above scheduling unit, the decoding unit cannot be operated efficiently, since the decoding unit does not perform any processing for a given period of time ($4.2_{msec}$ in FIG. 11).

SUMMARY

A scheduling apparatus according to one aspect of the present invention is a scheduling apparatus capable of accessing a processing apparatus that performs a prescribed process on each of first processing target data and second processing target data, in order of the first processing target data and the second processing target data. The scheduling apparatus includes a schedule generating unit that generates a first schedule for the processing apparatus to perform the prescribed process on the first processing target data, by allocating, to the processing apparatus, a first scheduled processing time for which the processing apparatus is able to perform the prescribed process on the first processing target data, and records the generated first schedule to a schedule recording unit, and a state information acquisition unit that acquires, from the processing apparatus, state information that serves as an indicator for computing a processing time actually required for the processing apparatus to perform the prescribed process on the first processing target data, in a case where the processing apparatus has performed the prescribed process on the first processing target data in accordance with the first schedule recorded in the schedule recording unit. The schedule generating unit computes the processing time actually required for the processing apparatus to perform the prescribed process on the first processing target data, based on the state information acquired by the state information acquisition unit, determines a second scheduled processing time for which the processing apparatus is able to perform the prescribed process on the second processing target data, based on the computed processing time, generates a second schedule for the processing apparatus to perform the prescribed process on the second processing target data, by allocating, to the processing apparatus, the determined second scheduled processing time, and records the generated second schedule to the schedule recording unit.

BRIEF DESCRIPTION OF DRAWINGS

FIG. 3 illustrates exemplary data recorded in a state information recording unit.

FIG. 4 illustrates exemplary data recorded in a data amount recording unit.

FIG. 5 illustrates exemplary data recorded in a processing time recording unit.

FIG. 6 illustrates exemplary data recorded in a storage buffer.

FIG. 7 illustrates exemplary data recorded in the state information recording unit after being updated by a rescheduling detection unit.

DESCRIPTION OF EMBODIMENT(S)

Figure 1:
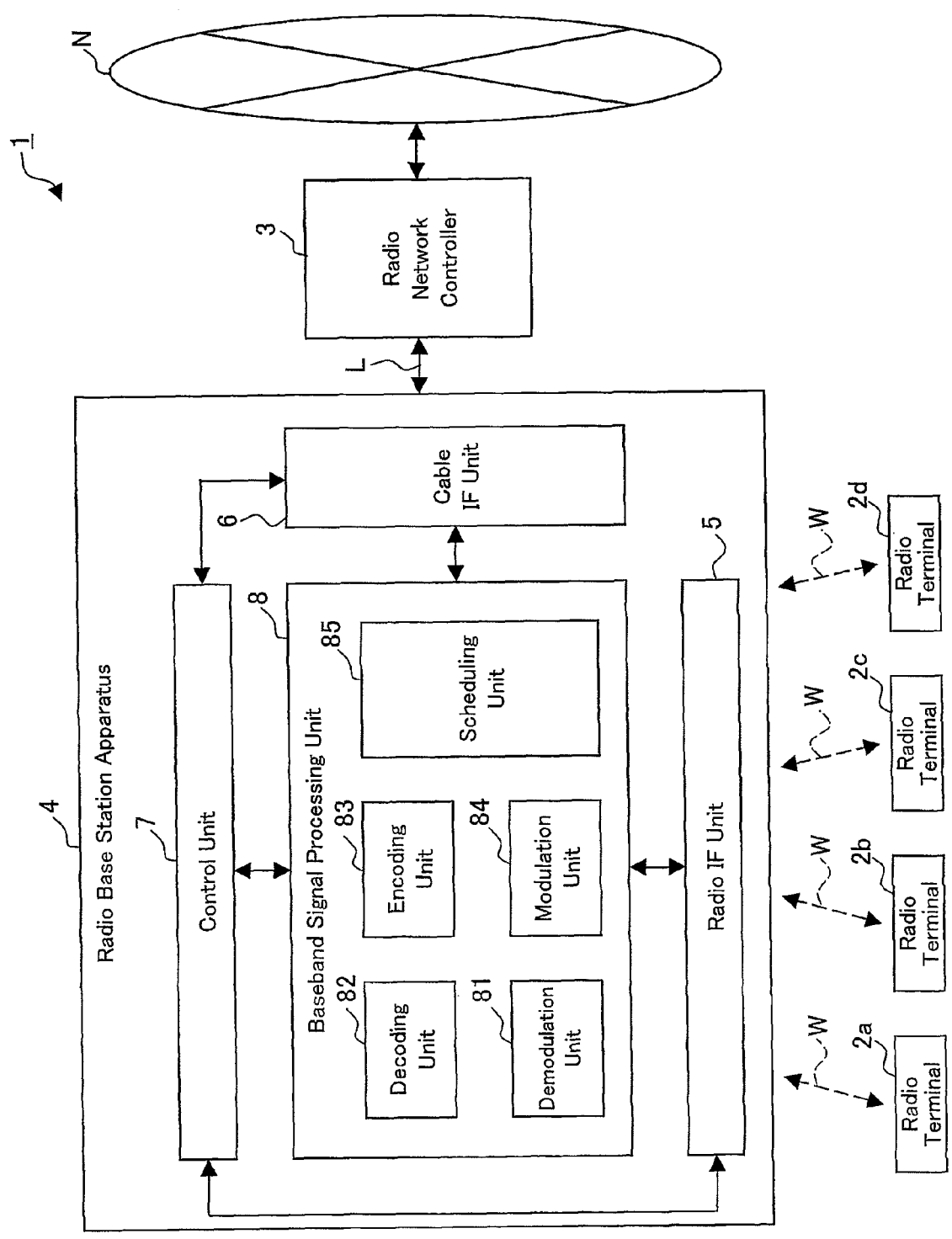
FIG. 1 is a block diagram illustrating a schematic configuration of a communication system.

A scheduling apparatus according to one aspect of an embodiment of the present invention is a scheduling apparatus capable of accessing a processing apparatus that performs a prescribed process on each of first processing target data and second processing target data, in order of the first processing target data and the second processing target data. The scheduling apparatus includes a schedule generating unit that generates a first schedule for the processing apparatus to perform the prescribed process on the first processing target data, by allocating, to the processing apparatus, a first scheduled processing time for which the processing apparatus is able to perform the prescribed process on the first processing target data, and records the generated first schedule to a schedule recording unit, and a state information acquisition unit that acquires, from the processing apparatus, state information that serves as an indicator for computing a processing time actually required for the processing apparatus to perform the prescribed process on the first processing target data, in a case where the processing apparatus has performed the prescribed process on the first processing target data in accordance with the first schedule recorded in the schedule recording unit. The schedule generating unit computes the processing time actually required for the processing apparatus to perform the prescribed process on the first processing target data, based on the state information acquired by the state information acquisition unit, determines a second scheduled processing time for which the processing apparatus is able to perform the prescribed process on the second processing target data, based on the computed processing time, generates a second schedule for the processing apparatus to perform the prescribed process on the second processing target data, by allocating, to the processing apparatus, the determined second scheduled processing time, and records the generated second schedule to the schedule recording unit.

According to the scheduling apparatus of the present invention, the schedule generating unit generates a first schedule for a processing apparatus to perform a prescribed process on first processing target data, by allocating, to the processing apparatus, a first scheduled processing time for which the processing apparatus is able to perform the prescribed process on the first processing target data. The schedule generating unit then records the generated first schedule to the schedule recording unit. The state information acquisition unit acquires state information that serves as an indicator for computing the processing time actually required for the processing apparatus to perform the prescribed process on the first processing target data from the processing apparatus, in the case where the processing apparatus has performed the prescribed process on the first processing target data in accordance with the first schedule recorded in the schedule recording unit.

Here, the schedule generating unit computes the processing time actually required for the processing apparatus to perform the prescribed process on the first processing target data, based on the acquired state information. The schedule generating unit determines a second scheduled processing time for which the processing apparatus is able to perform the prescribed process on second processing target data, based on the computed processing time. The schedule generating unit generates a second schedule for the processing apparatus to perform the prescribed process on the second processing target data, by allocating the determined second scheduled processing time to the processing apparatus. The schedule generating unit then records the generated second schedule to the schedule recording unit. The processing apparatus is thus able to perform the prescribed process on the second processing target data in accordance with the second schedule recorded in the schedule recording unit.

That is, the schedule generating unit allocates, to the processing apparatus, a second scheduled processing time determined based on the processing time actually required for the processing apparatus to perform the prescribed process on the first processing target data, rather than allocating to the processing apparatus a maximum scheduled processing time for which the processing apparatus is able to perform the prescribed process on the second processing target data. In other words, the schedule generating unit determines the second scheduled processing time with the previous processing time that the processing apparatus actually required as an indicator, and allocates the determined second scheduled processing time to the processing apparatus. The scheduling apparatus of the present invention is thus able to generate a schedule for operating a processing apparatus efficiently in comparison to a conventional scheduling apparatus, without allocating more scheduled processing time than necessary to the processing apparatus.

In the above scheduling apparatus, preferably, the processing apparatus is a decoding apparatus that performs a decoding process on each of the first processing target data and the second processing target data, in order of the first processing target data and the second processing target data. The state information includes a data amount identifier that serves as an indicator for computing a data amount actually decoded by the decoding apparatus, in a case where the decoding apparatus has performed the decoding process on the first processing target data. The scheduling apparatus further includes a processing time recording unit in which data amounts and processing times are recorded in association with one another. The schedule generating unit computes the data amount actually decoded by the decoding apparatus, based on the data amount identifier, reads out a processing time from the processing time recording unit, based on the computed data amount, and computes the read-out processing time as the processing time actually required for the decoding apparatus to perform the decoding process on the first processing target data.

In the above scheduling apparatus, preferably, the decoding apparatus performs error detection on a decoding result of the decoding process, and outputs the decoding result if an error is not detected in the decoding result, and feeds back the decoding result and repeats the decoding process again if an error is detected in the decoding result. The state information further includes repetition number information showing the number of repetitions for which the decoding apparatus has actually performed the decoding process on the first processing target data. The processing time recording unit has recorded therein numbers of repetitions, data amounts and processing times in association with one another, and the schedule generating unit computes the data amount actually decoded by the decoding apparatus, based on the data amount identifier, reads out a processing time from the processing time recording unit, based on the computed data amount and the number of repetitions shown by the repetition number information, and computes the read-out processing time as the processing time actually required for the decoding apparatus to perform the decoding process on the first processing target data.

In the above scheduling apparatus, preferably, the first processing target data and the second processing target data are user data transmitted from a radio terminal using a DCH (Dedicated Channel) or user data transmitted from a radio terminal using an E-DCH (Enhanced DCH).

A radio base station apparatus according to one embodiment of the present invention includes the above scheduling apparatus.

A scheduling method according to one embodiment of the present invention is a scheduling method according to which processing is executed by a computer capable of accessing a processing apparatus that performs a prescribed process on each of first processing target data and second processing target data, in order of the first processing target data and the second processing target data. The scheduling method includes a schedule generating step of generating a first schedule for the processing apparatus to perform the prescribed process on the first processing target data, by allocating, to the processing apparatus, a first scheduled processing time for which the processing apparatus is able to perform the prescribed process on the first processing target data and recording the first schedule to a schedule recording unit, and a state information acquiring step of acquiring, from the processing apparatus, state information that serves as an indicator for computing a processing time actually required for the processing apparatus to perform the prescribed process on the first processing target data, in a case where the processing apparatus has performed the prescribed process on the first processing target data in accordance with the first schedule recorded in the schedule recording unit. In the schedule generating step, the processing time actually required for the processing apparatus to perform the prescribed process on the first processing target data is computed based on the state information acquired in the state information acquiring step, a second scheduled processing time for which the processing apparatus is able to perform the prescribed process on the second processing target data is determined based on the computed processing time, and a second schedule for the processing apparatus to perform the prescribed process on the second processing target data is generated by allocating, to the processing apparatus, the determined second scheduled processing time, and recorded to the schedule recording unit.

A program recording medium according to one embodiment of the present invention is a program recording medium having recorded thereon a program for causing a computer capable of accessing a processing apparatus that performs a prescribed process on each of first processing target data and second processing target data, in order of the first processing target data and the second processing target data, to execute processing. The program causes the computer to execute a schedule generating process of generating a first schedule for the processing apparatus to perform the prescribed process on the first processing target data, by allocating, to the processing apparatus, a first scheduled processing time for which the processing apparatus is able to perform the prescribed process on the first processing target data, and a state information acquiring process of acquiring, from the processing apparatus, state information that serves as an indicator for computing a processing time actually required for the processing apparatus to perform the prescribed process on the first processing target data, in a case where the processing apparatus has performed the prescribed process on the first processing target data in accordance with the first schedule. In the schedule generating process, the processing time actually required for the processing apparatus to perform the prescribed process on the first processing target data is computed based on the state information acquired in the state information acquiring process. Further, a second scheduled processing time for which the processing apparatus is able to perform the prescribed process on the second processing target data is determined based on the computed processing time, and a second schedule for the processing apparatus to perform the prescribed process on the second processing target data is generated by allocating, to the processing apparatus, the determined second scheduled processing time.

A scheduling method according to one embodiment of the present invention is a scheduling method according to which processing is executed by a computer capable of accessing a processing apparatus that performs a prescribed process on each of first processing target data and second processing target data, in order of the first processing target data and the second processing target data. The scheduling method includes a schedule generating step of generating a first schedule for the processing apparatus to perform the prescribed process on the first processing target data, by allocating, to the processing apparatus, a first scheduled processing time for which the processing apparatus is able to perform the prescribed process on the first processing target data, and a state information acquiring step of acquiring, from the processing apparatus, state information that serves as an indicator for computing a processing time actually required for the processing apparatus to perform the prescribed process on the first processing target data, in a case where the processing apparatus has performed the prescribed process on the first processing target data in accordance with the generated first schedule. In the schedule generating step, the processing time actually required for the processing apparatus to perform the prescribed process on the first processing target data is computed based on the state information acquired in the state information acquiring step, a second scheduled processing time for which the processing apparatus is able to perform the prescribed process on the second processing target data is determined based on the computed processing time, and a second schedule for the processing apparatus to perform the prescribed process on the second processing target data is generated by allocating, to the processing apparatus, the determined second scheduled processing time.

As described above, the foregoing scheduling apparatus, scheduling methods and computer program achieve the effect of enabling a schedule for efficiently operating a processing apparatus to be generated, without allocating more scheduled processing time than necessary to the processing apparatus.

Hereinafter, a more specific embodiment of the present invention will be described in detail with reference to the drawings.

FIG. 1 is a block diagram illustrating a schematic configuration of a communication system 1 according to the present embodiment. That is, the communication system 1 according to the present embodiment is provided with radio terminals 2a to 2d, a radio network controller 3, and a radio base station apparatus 4. The radio terminals 2a to 2d and the radio base station apparatus 4 are able to access one another via radio transmission paths W In the present embodiment, the HSUPA scheme is employed as the communication scheme between the radio terminals 2a to 2d and the radio base station apparatus 4. Note that, in addition to the HSUPA scheme, the HSDPA (High Speed Downlink Packet Access) scheme may be employed as the communication scheme between the radio terminals 2a to 2d.

The radio network controller 3 and the radio base station apparatus 4 are connected to one another via a cable transmission path L. In the present embodiment, an ATM (Asynchronous Transfer Mode) scheme is employed as the communication scheme between the radio network controller 3 and the radio base station apparatus 4. Further, the radio network controller 3 is connected to a core network N. Note that while not illustrated, the core network N includes a circuit switching apparatus, a packet switching apparatus, and home location resistors, for example.

In FIG. 1, four radio terminals 2a to 2d, one radio network controller 3, and one radio base station apparatus 4 are illustrated in order to simplify the description, although the number of radio terminals 2a to 2d, radio network controllers 3, and radio base station apparatuses 4 constituting the communication system 1 is arbitrary. The communication system 1 may also include terminal apparatuses and a variety of servers (Web server, mail server, homepage server, proxy server, DNS server, DHCP server, authentication server, etc.).

The radio terminals 2a to 2d communicate with other radio terminals or cable terminals via the radio base station apparatus 4. Specifically, the radio terminals 2a to 2d perform an encoding process on user data to be transmitted to the radio base station apparatus 4. The radio terminals 2a to 2d transmit the encoded user data to the radio base station apparatus 4, by using the DCH separately allocated to each of the radio terminals 2a to 2d. In the present embodiment, the HSUPA scheme is employed as the communication scheme between the radio terminals 2a to 2d and the radio base station apparatus 4. The radio terminals 2a to 2d according to the present embodiment are thus able to transmit encoded user data at high speed to the radio base station apparatus 4 by using the E-DCH separately allocated to each of the radio terminals 2a to 2d, rather than the DCH. The radio base station apparatus 4 performs a decoding process on the encoded user data transmitted from the radio terminals 2a to 2d using the above DCH or the above E-DCH. The radio base station apparatus 4 transmits the decoded user data to other radio terminals or cable terminals via the radio network controller 3.

The radio terminals 2a to 2d perform a decoding process on user data transmitted from other radio terminals or cable terminals via the radio base station apparatus 4.

Note that, hereinafter, when describing user data transmitted from the radio terminals 2a to 2d using a DCH and user data transmitted from the radio terminals 2a to 2d using an E-DCH, user data transmitted from the radio terminals 2a to 2d using a DCH will be referred to as "DCH data" and user data transmitted from the radio terminals 2a to 2d using an E-DCH will be referred to as "EDCH data" only in cases where it is necessary to make a distinction. Note that where it is not particularly necessary to distinguish between DCH data and EDCH data or when referring to this data collectively, the DCH data and EDCH data will be referred to simply as "user data."

The radio network controller (RNC) 3 controls the radio base station apparatus 4, and performs incoming and outgoing call connection control, call end control, diversity handover control, and the like.

The radio base station apparatus (Node-B) 4 is provided with a radio interface unit (radio IF unit in FIG. 1) 5, a cable interface unit (cable IF unit in FIG. 1) 6, a control unit 7, and a baseband signal processing unit 8.

The radio interface unit 5 mediates the exchange of data between the radio terminals 2a to 2d and the baseband signal processing unit 8. For example, the radio interface unit 5 receives encoded user data transmitted from the radio terminals 2a to 2d via the radio transmission path Ws, and outputs the received user data to a demodulation unit 81 (described below) of the baseband signal processing unit 8. Also, the radio interface unit 5, for example, receives encoded user data output from a modulation unit 84 (described below) of the baseband signal processing unit 8, and transmits the received user data to the radio terminals 2a to 2d via the radio transmission paths W Further, the radio interface unit 5, for example, receives a result signal output from a decoding unit 82 (described below) of the baseband signal processing unit 8, and transmits the received result signal to the radio terminals 2a to 2d via the radio transmission paths W Note that the result signal is a signal showing whether the decoding process by the decoding unit 82 ended normally. In the present embodiment, the radio interface unit 5 collectively transmits a received result signal to each of the radio terminals 2a to 2d, by using an E-HICH (E-DCH Hybrid Automatic Repeat Request Indicator Channel) commonly allocated to the radio terminals 2a to 2d.

The cable interface unit 6 mediates the exchange of data between the radio network controller 3 and the baseband signal processing unit 8. For example, the cable interface unit 6 receives decoded user data output from the decoding unit 82 (described below) of the baseband signal processing unit 8, and transmits the received user data to the radio network controller 3 via the cable transmission path L. Also, the cable interface unit 6, for example, receives user data transmitted from the radio network controller 3 via the cable transmission path L, and outputs the received user data to an encoding unit 83 (described below) of the baseband signal processing unit 8.

The control unit 7 receives and transmits call control signals with the radio network controller 3 via the cable interface unit 6. The control unit 7 also performs radio channel management (setting, opening, etc. of radio channels) of the radio terminals 2a to 2d.

The baseband signal processing unit 8 has functions such as encoding transmission data, framing, spread modulation, inverse dispersion of received data, data decoding, HARQ (Hybrid Automatic Repeat reQuest) and scheduling. The baseband signal processing unit 8 is thus provided with a demodulation unit 81, a decoding unit 82, an encoding unit 83, a modulation unit 84, and a scheduling unit 85.

The demodulation unit 81 performs a demodulation process on encoded user data output from the radio interface unit 5. Specifically, the demodulation unit 81 performs a demodulation process such as inverse diffusion process, synchronous detection process or RAKE combining process on the user data. The demodulation unit 81 outputs user data that has undergone the demodulation process to the decoding unit 82.

The decoding unit (processing apparatus, decoding apparatus) 82 is constituted by a turbo decoder that performs soft-decision decoding using a MAP (Maximum a-posteriori Probability) algorithm, for example. Specifically, the decoding unit 82 firstly performs a decoding process on user data output from the demodulation unit 81. The decoding unit 82 then performs error detection on a decoding result of the decoding process using an error detection code (CRC, parity code, checksum, etc.). If an error is not detected in the decoding result, the decoding unit 82 outputs the decoded user data to the cable interface unit 6. Here, in the case where the user data is EDCH data, the decoding unit 82 instructs the radio interface unit 5 to transmit a result signal (Ack signal) indicating that the decoding process ended normally to the radio terminals 2a to 2d that transmitted the EDCH data.

On the other hand, if an error is detected in the decoding result, the decoding unit 82 feeds back the decoding result and repeats the decoding process again. That is, if an error is detected in the decoding result, the decoding unit 82 repeats the decoding process on the user data transmitted from the radio terminals 2a to 2d up to a maximum number of repetitions. The decoding unit 82 discards the user data transmitted from the radio terminals 2a to 2d if an error is still detected in the decoding result despite the decoding process having been repeated for the maximum number of repetition. Here, if the user data is EDCH data, the decoding unit 82 instructs the radio interface unit 5 to transmit a result signal (Nack signal) indicating that the decoding process did not end normally to the radio terminals 2a to 2d that transmitted the EDCH data. Note that the maximum number of repetitions for which the decoding unit 82 is able to perform the decoding process on user data is prerecorded in a memory (not shown) of the decoding unit 82.

The encoding unit 83 performs an encoding process on user data output from the cable interface unit 6. The encoding unit 83 outputs user data that has undergone the encoding process to the modulation unit 84.

The modulation unit 84 performs a modulation process on encoded user data output from the encoding unit 83. The modulation unit 84 outputs user data that has undergone the modulation process to the radio interface unit 5.

Figure 2:
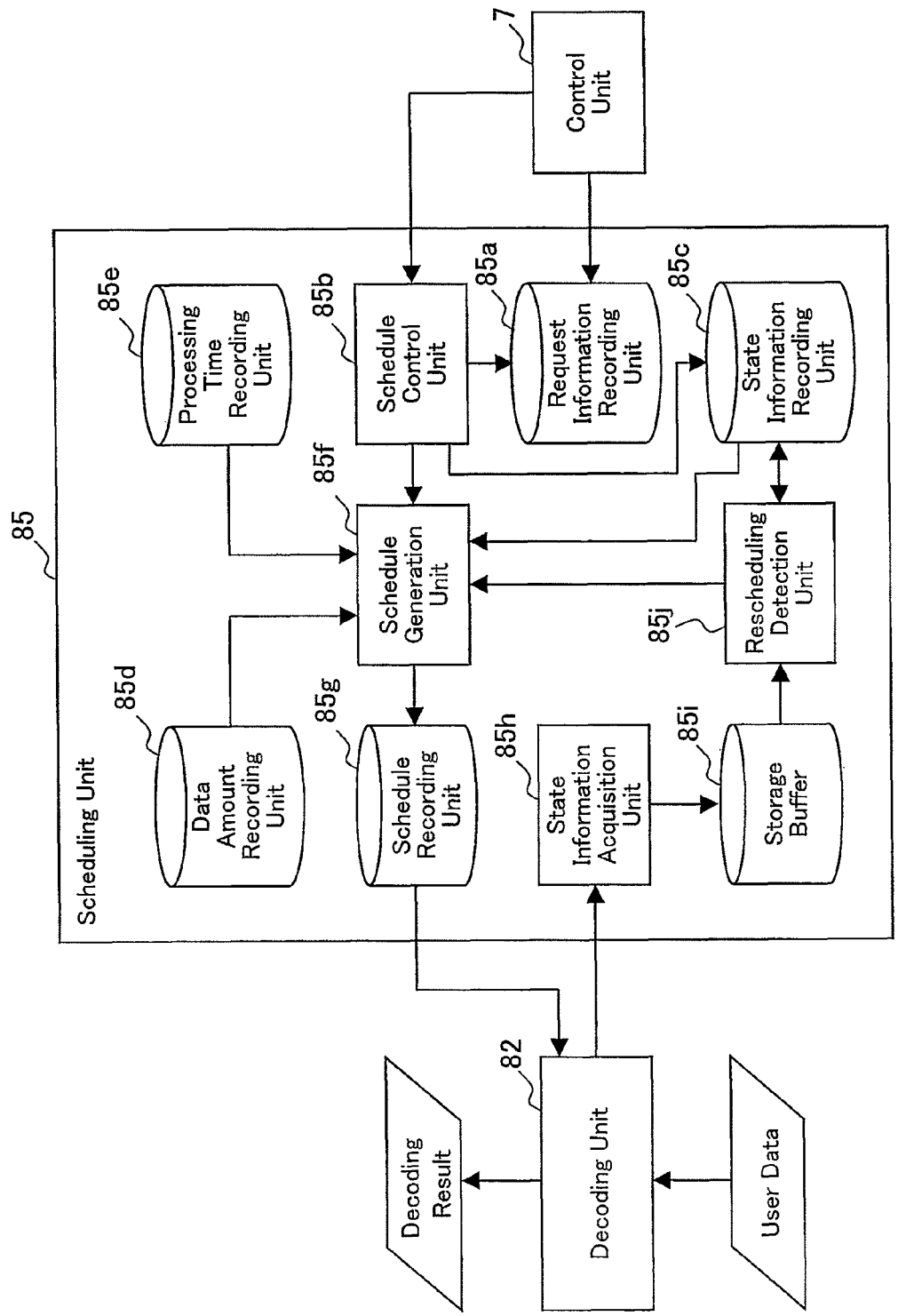
FIG. 2 is a block diagram illustrating a schematic configuration of a scheduling unit.

The scheduling unit (scheduling apparatus) 85, when instructed by the control unit 7, generates a schedule for the decoding unit 82 to perform the decoding process on user data, by allocating to the decoding unit 82 a scheduled processing time for which the decoding unit 82 is able to perform the decoding process on the user data. The scheduling unit 85 is thus provided with a request information recording unit 85a, a schedule control unit 85b, a state information recording unit 85c, a data amount recording unit 85d, a processing time recording unit 85e, a schedule generation unit 85f, a schedule recording unit 85g, a state information acquisition unit 85h, a storage buffer 85i, and a rescheduling detection unit 85j, as illustrated in FIG. 2. Note that the scheduling unit 85 also has a function of generating a schedule for the encoding unit 83, in addition to generating a schedule for the decoding unit 82.

Here, the functions of the schedule control unit 85b, the schedule generation unit 85f, the state information acquisition unit 85h and the rescheduling detection unit 85j are realized as a result of an arithmetic device such as a CPU provided in a computer executing a prescribed computer program. Accordingly, a program for realizing the above functions by a computer or a recording medium with such a computer program recorded thereon is also within the scope of one embodiment of the present invention. The request information recording unit 85a, the state information recording unit 85c, the data amount recording unit 85d, the processing time recording unit 85e, the schedule recording unit 85g and the storage buffer 85i are embodied by a built-in storage device of a computer or a storage device accessible from a computer.

Request information requesting that schedule generation be started is written in the request information recording unit 85a by the control unit 7.

The schedule control unit 85b instructs the schedule generation unit 85f to generate a schedule for the decoding unit 82, in the case where request information has been written in the request information recording unit 85a by the control unit 7. Specifically, the schedule control unit 85b determines whether request information has been written in the request information recording unit 85a by the control unit 7, by periodically monitoring the request information recording unit 85a. The schedule control unit 85b acquires an initial value of a TFCI (Transport Format Combination Indicator), an initial value of an E-TFCI (Enhanced TFCI), and a maximum number of repetitions from the control unit 7, if it is determined that request information has been written in the request information recording unit 85a by the control unit 7. Note that the maximum number of repetitions shows the maximum number of repetitions for which the decoding unit 82 is able to repeatedly perform the decoding process.

In the present embodiment, the schedule control unit 85b acquires, from the control unit 7, an initial value of the TFCI which serves as an indicator for computing the maximum amount of data for which the decoding unit 82 is able to perform the decoding process on DCH data. The schedule control unit 85b also acquires, from the control unit 7, an initial value of the E-TFCI which serves as an indicator for computing the maximum amount of data for which the decoding unit 82 is able to perform the decoding process on EDCH data. Further, the schedule control unit 85*b* acquires, from the control unit 7, the maximum number of repetitions for which the decoding unit 82 is able to repeatedly perform the decoding process. The schedule control unit 85*b* records the acquired initial value of the TFCI, initial value of the E-TFCI, and maximum number of repetitions to the state information recording unit 85*c*. That is, the initial value of the TFCI, the initial value of the E-TFCI, and the maximum number of repetitions serve as state information. The schedule control unit 85*b* then instructs the schedule generation unit 85*f* to generate a schedule for the decoding unit 82.

FIG. 3 illustrates exemplary data recorded in the state information recording unit 85*c* according to the present embodiment. That is, the state information recording unit 85*c* according to the present embodiment records data as a table 850*c*. Note that the data structure is arbitrary and is not limited to a table structure. As illustrated in FIG. 3, an initial value "50" of the TFCI, an initial value "50" of the E-TFCI, and a maximum number of repetitions "10" are recorded as state information in the table 850*c*. That is, the initial value "50" of the TFCI is an identifier that serves as an indicator for computing the maximum amount of data for which the decoding unit 82 is able to perform the decoding process on DCH data. The initial value "50" of the E-TFCI is an identifier that serves as an indicator for computing the maximum amount of data for which the decoding unit 82 is able to perform the decoding process on EDCH data. The maximum number of repetitions "10" shows the maximum number of repetitions for which the decoding unit 82 is able to repeatedly perform the decoding process.

FIG. 4 illustrates exemplary data recorded in the data amount recording unit 85*d* according to the present embodiment. That is, the data amount recording unit 85*d* according to the present embodiment records data as a table 850*d*. Note that the data structure is arbitrary and is not limited to a table structure. As illustrated in FIG. 4, TFCI values and E-TFCI values are recorded in the table 850*d* in association with data amounts. Note that in the example illustrated in FIG. 4, the data amounts are represented in "bit" units.

FIG. 5 illustrates exemplary data recorded in the processing time recording unit 85*e* according to the present embodiment. That is, the processing time recording unit 85*e* according to the present embodiment records data as tables 850*e*, 851*e*, ..., and 859*e*. Note that the data structure is arbitrary and is not limited to a table structure. As illustrated in FIG. 5, a number of repetitions "1", a data amount and a processing time are recorded in the table 850*e* in association with one another. Also, a number of repetitions "2", a data amount and a processing time are recorded in the table 851*e* in association with one another. Further, a number of repetitions "10", a data amount and a processing time are recorded in the table 859*e* in association with one another. The plurality of tables 850*e*, 851*e*, ..., and 859*e* are thus recorded in the processing time recording unit 85*e* according to the number of repetitions. That is, the plurality of tables 850*e*, 851*e*, ..., and 859*e* are recorded in the processing time recording unit 85*e*, so that the processing time increases the greater the number of repetitions, even for the same data amount. Note that in the example illustrated in FIG. 5, the data amounts are represented in "bit" units, and processing time is represented in "µsec" units.

The schedule generation unit 85*f*, when instructed by the schedule control unit 85*b* to generate a schedule for the decoding unit 82, generates a schedule for the decoding unit 82 with reference to the state information recording unit 85*c*, the data amount recording unit 85*d*, and the processing time recording unit 85*e*.

Specifically, the schedule generation unit 85*f* firstly reads out the initial value of the TFCI, the initial value of the E-TFCI, and the maximum number of repetitions from the state information recording unit 85*c*. In the present embodiment, the schedule generation unit 85*f* reads out the initial value "50" of the TFCI, the initial value "50" of the E-TFCI, and the maximum number of repetitions "10" from the state information recording unit 85*c*. The schedule generation unit 85*f* then reads out a data amount from the data amount recording unit 85*d*, based on the initial value of the TFCI. The schedule generation unit 85*f* is thereby able to detect the maximum amount of data for which the decoding unit 82 is able to perform the decoding process on DCH data. The schedule generation unit 85*f* also reads out a data amount from the data amount recording unit 85*d*, based on the initial value of the E-TFCI. The schedule generation unit 85*f* is thereby able to detect the maximum amount of data for which the decoding unit 82 is able to perform the decoding process on EDCH data.

The schedule generation unit 85*f* selects the table corresponding to the maximum number of repetitions read out from the state information recording unit 85*c*, out of the tables 850*e*, 851*e*, ..., and 859*e* recorded in the processing time recording unit 85*e*. In the present embodiment, since the read-out maximum number of repetitions is "10", the schedule generation unit 85*f* selects the table 859*e* for the maximum number of repetitions "10", out of the tables 850*e*, 851*e*, ..., and 859*e* recorded in the processing time recording unit 85*e*.

The schedule generation unit 85*f* reads out a processing time from the selected table 859*e*, based on the maximum data amount corresponding to the read-out initial value of the TFCI. The schedule generation unit 85*f* determines the scheduled processing time for which the decoding unit 82 is able to perform the decoding process on DCH data, based on the read-out processing time. In the present embodiment, the schedule generation unit 85*f* determines the read-out processing time as the scheduled processing time, without modification. Note that the scheduled processing time determined here is the maximum scheduled processing time for DCH data. In the present embodiment, the maximum scheduled processing time for DCH data is $5_{msec}$.

The schedule generation unit 85*f* reads out a processing time from the selected table 859*e*, based on the maximum data amount corresponding to the read-out initial value of the E-TFCI. The schedule generation unit 85*f* determines the scheduled processing time for which the decoding unit 82 is able to perform the decoding process on EDCH data, based on the read-out processing time. In the present embodiment, the schedule generation unit 85*f* determines the read-out processing time as the scheduled processing time, without modification. Note that the processing time determined here is the maximum scheduled processing time for EDCH data. In the present embodiment, the maximum scheduled processing time for EDCH data is $5_{msec}$.

The schedule generation unit 85*f* generates a schedule for the decoding unit 82, by allocating the determined maximum scheduled processing time for DCH data and the determined maximum scheduled processing time for EDCH data to the decoding unit 82. Note that the sum $10_{msec}$ of the maximum scheduled processing time $5_{msec}$ for DCH data and the maximum scheduled processing time $5_{msec}$ for EDCH data is one embodiment of the first scheduled processing time according to the present invention. Specifically, the schedule generation unit 85*f* generates a schedule for the decoding unit 82 so that the decoding process of EDCH data, whose decoding result needs to be notified to the radio terminals 2*a* to 2*d*, is prioritized over the decoding process of DCH data, whose decoding result does not needs to be notified to the radio terminals 2a to 2d. That is, the schedule generation unit 85f generates a schedule for the decoding unit 82 so that the decoding process by the decoding unit 82 is performed from the EDCH data. According to the specifications defined in 3GPP, the decoding process of EDCH data by the decoding unit 82 is to be performed every TTI of an E-DCH. The scheduling unit thus generates a schedule for the decoding unit 82 so that the decoding process of DCH data is performed between the decoding processes of EDCH data by the decoding unit 82.

Figure 10:
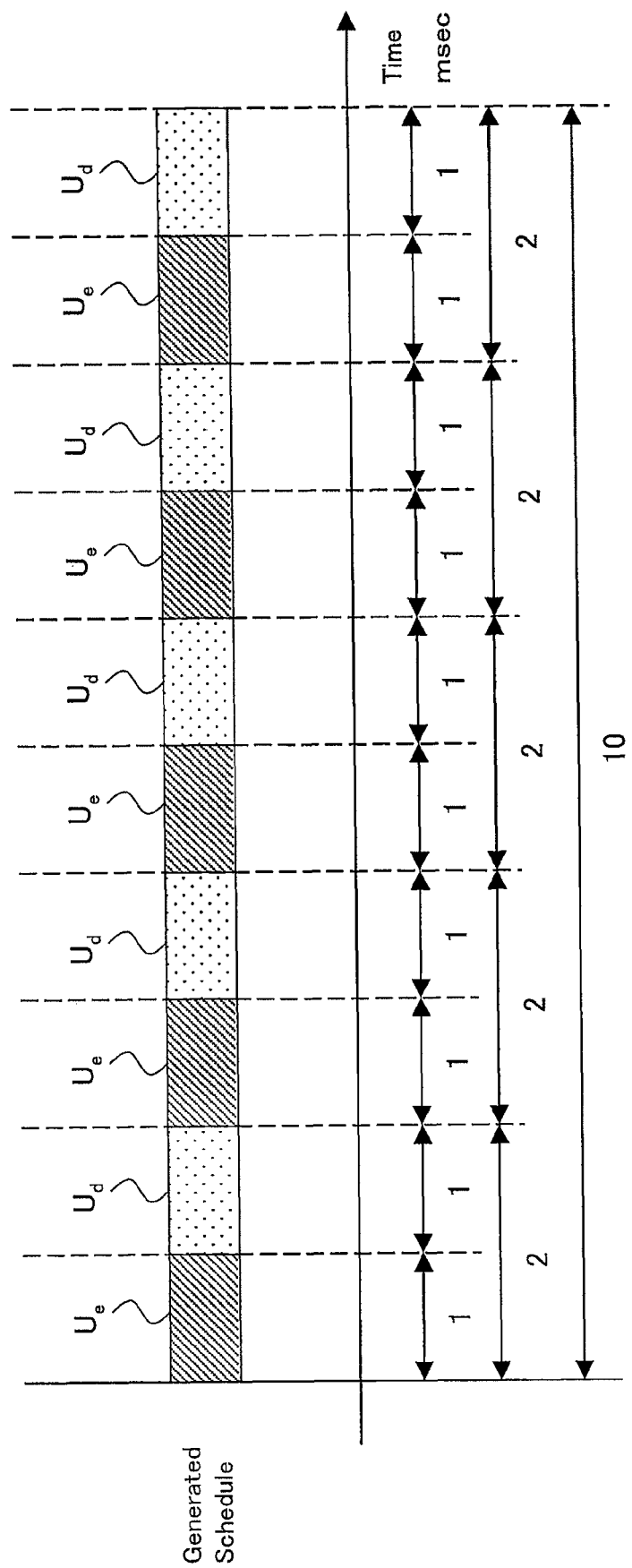
FIG. 10 illustrates an exemplary schedule for a decoding unit generated by a scheduling unit.

Here, it is assumed that the schedule generation unit 85f according to the present embodiment generates the schedule illustrated in FIG. 10, similarly to that described in the Background Art. Note that, hereinafter, the schedule illustrated in FIG. 10 will be referred to in the description as "the first schedule". Hereinafter, the letters "$U_d$" and "$U_e$" will be appended to DCH data and EDCH data, respectively. The schedule generation unit 85f records the generated first schedule to the schedule recording unit 85g.

The decoding unit 82 is thereby able to perform the decoding process on the DCH data $U_d$ and the EDCH data $U_e$ in accordance with the first schedule recorded in the schedule recording unit 85g. Note that, hereinafter, DCH data $U_d$ that is to undergo the decoding process in accordance with the first schedule and EDCH data $U_e$ that is to undergo the decoding process in accordance with the first schedule will be referred to in the description respectively as "first DCH data $U_d$" and "first EDCH data $U_e$".

Figure 11:
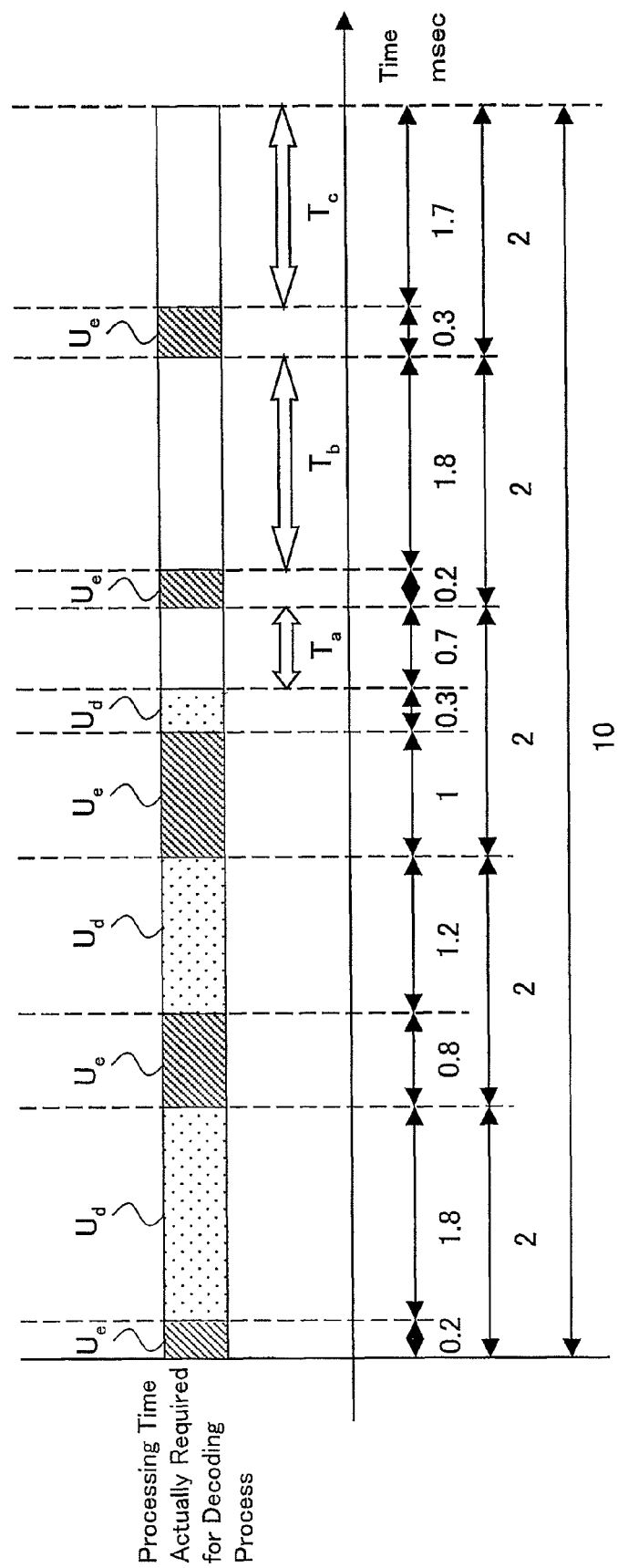
FIG. 11 illustrates an exemplary processing time actually required for the decoding unit to perform a decoding process on user data, in the case where the decoding unit has performed the decoding process on the user data.

Here, in the present embodiment, it is assumed that the processing time actually required for the decoding unit 82 to perform the decoding process on the first DCH data (first processing target data) $U_d$ and the first EDCH data (first processing target data) $U_e$ is as illustrated in FIG. 11, similarly to that described in the Background Art.

The state information acquisition unit 85h acquires, from the decoding unit 82, state information (TFCI value, E-TFCI value, and repetition number information) that serves as an indicator for computing the processing time actually required for the decoding unit 82 to perform the decoding process on the first DCH data $U_d$ and the first EDCH data $U_e$. Note that the state information is computed by the decoding unit 82 based on the decoding result of the decoding process that the decoding unit 82 performed on the first DCH data $U_d$ and the first EDCH data $U_e$. In the present embodiment, it is assumed that the state information acquisition unit 85h acquires the TFCI value "35", the E-TFCI value "28", and the number of repetitions "6" from the decoding unit 82. The state information acquisition unit 85h records the acquired state information to the storage buffer 85i.

FIG. 6 illustrates exemplary data recorded in the storage buffer 85i according to the present embodiment. That is, the storage buffer 85i according to the present embodiment records data as a table 850i. Note that the data structure is arbitrary and is not limited to a table structure. As illustrated in FIG. 6, the TFCI value "35", the E-TFCI value "28", and the number of repetitions "6" are recorded in the table 850i as state information. That is, the TFCI value "35" is an identifier (data amount identifier) that serves as an indicator for computing the amount of data actually decoded by the decoding unit 82, in the case where the decoding unit 82 has performed the decoding process on the first DCH data $U_d$. The E-TFCI value "28" is an identifier (data amount identifier) that serves as an indicator for computing the amount of data actually decoded by the decoding unit 82, in the case where the decoding unit 82 has performed the decoding process on the first EDCH data $U_e$. The number of repetitions "6" shows the number of repetitions for which the decoding unit 82 actually performed the decoding process on the first DCH data $U_d$ and the first EDCH data $U_e$.

The rescheduling detection unit 85j instructs the schedule generation unit 85f to again generate a schedule for the decoding unit 82, in the case where the state information recorded in the storage buffer 85i differs from the state information recorded in the state information recording unit 85c. Specifically, the rescheduling detection unit 85j firstly reads outs the state information recorded in the storage buffer 85i. In the present embodiment, the rescheduling detection unit 85j reads out the TFCI value "35", the E-TFCI value "28", and the number of repetitions "6" recorded in the storage buffer 85i. The, rescheduling detection unit 85j also reads outs the state information recorded in the state information recording unit 85c. In the present embodiment, the rescheduling detection unit 85j reads out the initial value "50" of the TFCI, the initial value "50" of the E-TFCI, and the maximum number of repetitions "10" recorded in the state information recording unit 85c.

The rescheduling detection unit 85j contrasts and compares the TFCI value, the E-TFCI value, and the number of repetitions read out from the storage buffer 85i with the initial value of the TFCI, the initial value of the E-TFCI, and the maximum number of repetitions read out from the state information recording unit 85c. If the contrasting and comparison result shows that at least one of the TFCI values, the E-TFCI values, and the numbers of repetitions differ from one another, the rescheduling detection unit 85j performs the following processing. That is, the rescheduling detection unit 85j updates the initial value of the TFCI, the initial value of the E-TFCI, and the maximum number of repetitions recorded in the state information recording unit 85c to the TFCI value, the E-TFCI value and the number of repetitions shown by the repetition number information read out from the storage buffer 85i. The rescheduling detection unit 85j then instructs the schedule generation unit 85f to again generate a schedule for the decoding unit 82.

In the present embodiment, since the TFCI values, the E-TFCI values, and the numbers of repetitions all differ from one another, the rescheduling detection unit 85j updates the state information recorded in the state information recording unit 85c. That is, in the present embodiment, since the TFCI value, the E-TFCI value, and the number of repetitions recorded in the storage buffer 85i are respectively "35", "28" and "6", the rescheduling detection unit 85j updates the TFCI value, the E-TFCI value, and the number of repetitions recorded in the state information recording unit 85c, as illustrated in FIG. 7. State information (TFCI value, E-TFCI value, number of repetitions) that serves as an indicator for computing the processing time actually required for the decoding unit 82 to perform the decoding process on the first DCH data $U_d$ and the first EDCH data $U_e$ will thereby be recorded in the state information recording unit 85c.

The schedule generation unit 85f generates a schedule for the decoding unit 82 again, with reference to the state information recording unit 85c, the data amount recording unit 85d, and the processing time recording unit 85e, when instructed by the rescheduling detection unit 85j to again generate a schedule for the decoding unit 82. Note that, hereinafter, the schedule generated again by the schedule generation unit 85f will be referred to in the description as "the second schedule." Hereinafter, DCH data $U_d$ on which the decoding process is performed in accordance with the second schedule and EDCH data $U_e$ on which the decoding process is performed in accordance with the second schedule will be referred to respectively as "second DCH data $U_d$" and "second EDCH data $U_e$."

Specifically, the schedule generation unit 85f firstly reads out the TFCI value, the E-TFCI value, and the repetition number information from the state information recording unit 85c. In the present embodiment, the schedule generation unit 85f reads out the TFCI value "35", the E-TFCI value "28", and the number of repetitions "6" from the state information recording unit 85c. The schedule generation unit 85f then reads out a data amount from the data amount recording unit 85d, based on the TFCI value. The schedule generation unit 85f is thereby able to detect the amount of data actually processed by the decoding unit 82, in the case where the decoding unit 82 has performed the decoding process on the first DCH data $U_d$. The schedule generation unit 85f also reads out a data amount from the data amount recording unit 85d, based on the E-TFCI value. The schedule generation unit 85f is thereby able to detect the amount of data actually processed by the decoding unit 82, in the case where the decoding unit 82 has performed the decoding process on the first EDCH data $U_e$.

The schedule generation unit 85f then selects the table corresponding to the number of repetitions shown by the repetition number information read out from the state information recording unit 85c, out of the tables 850e, 851e, ..., and 859e recorded in the processing time recording unit 85e. In the present embodiment, since the number of repetitions shown by the read-out repetition number information is "6", the schedule generation unit 85f selects the table 855e (not shown in FIG. 5) for the number of repetitions "6", out of the tables 850e, 851e, and 859e recorded in the processing time recording unit 85e.

The schedule generation unit 85f reads out a processing time from the selected table 855e, based on the read-out data amount of the TFCI value. Note that the processing time read out here is the processing time actually required for the decoding unit 82 to perform the decoding process on the first DCH data $U_d$. The schedule generation unit 85f determines a scheduled processing time for which the decoding unit 82 is able to perform the decoding process on the second DCH data $U_d$, based on the read-out processing time. In the present embodiment, the schedule generation unit 85f determines the read-out processing time as the scheduled processing time, without modification. Note that in the present embodiment, it is assumed that the schedule generation unit 85f determines the scheduled processing time of the second DCH data $U_d$ to be $3.3_{msec}$ (see FIG. 11).

The scheduling generation unit 85f also reads out a processing time from the selected table 855e, based on the read-out data amount of the E-TFCI value. Note that the processing time read out here is the processing time actually required for the decoding unit 82 to perform the decoding process on the first EDCH data $U_e$. The schedule generation unit 85f determines a scheduled processing time for which the decoding unit 82 is able to perform the decoding process on the second EDCH data $U_e$, based on the read-out processing time. In the present embodiment, the schedule generation unit 85f determines the read-out processing time as the scheduled processing time, without modification. Note that in the present embodiment, the schedule generation unit 85f determines the scheduled processing time of the second EDCH data $U_e$ to be $2.5_{msec}$ (see FIG. 11).

The schedule generation unit 85f generates a second schedule for the decoding unit 82 by allocating the determined scheduled processing time of the second DCH data $U_d$ and the determined scheduled processing time of the second EDCH data $U_e$ to the decoding unit 82. Note that the sum $5.8_{msec}$ of the scheduled processing time $3.3_{msec}$ of the second DCH data and the scheduled processing time $2.5_{msec}$ of the second EDCH data is one embodiment of the second scheduled processing time according to the present embodiment. Specifically, the schedule generation unit 85f firstly divides the scheduled processing time $2.5_{msec}$ of the second EDCH data $U_e$ by five. $0.5_{msec}$ is thereby computed. The schedule generation unit 8.5f generates a second schedule for the decoding unit 82 so that the decoding process ($0.5_{msec}$) of second EDCH data $U_e$ is performed every $2_{msec}$, which is the TTI of an E-DCH. The schedule generation unit 85f generates a second schedule for the decoding unit 82 so that the decoding process ($3.3_{msec}$) of the second DCH data $U_d$ is performed between the decoding processes of second EDCH data $U_e$ by the decoding unit 82.

Figure 8:
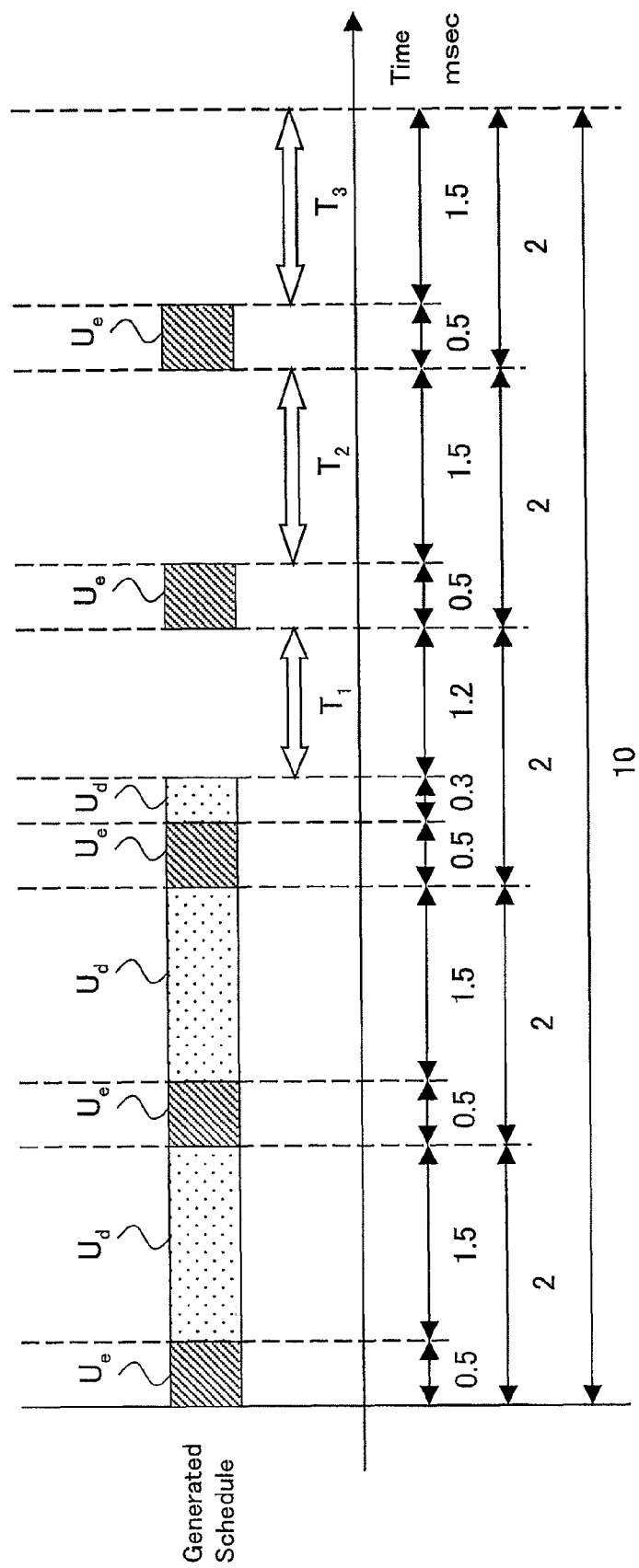
FIG. 8 illustrates an exemplary schedule for a decoding unit generated again by a scheduling unit.

A second schedule is thereby generated by the schedule generation unit 85f, as illustrated in FIG. 8. The schedule generation unit 85f records the generated second schedule to the schedule recording unit 85g. Hence, the decoding unit 82 is able to perform the decoding process on the second DCH data (second processing data) $U_d$ and the second EDCH data (second processing data) $U_e$ in accordance with the second schedule recorded in the schedule recording unit 85g.

That is, the schedule generation unit 85f according to the present embodiment allocates, to the decoding unit 82, a second scheduled processing time determined based on the processing time actually required for the decoding unit 82 to perform the decoding process on the first DCH data $U_d$ and the first EDCH data $U_e$, rather than allocating, to the decoding unit 82, the maximum scheduled processing time for which the decoding unit 82 is able to perform the decoding process on the second DCH data $U_d$ and the second EDCH data $U_e$. In other words, the schedule generation unit 85f determines the current second scheduled processing time with the previous processing time actually required by the decoding unit 82 as an indicator, and allocates the determined second scheduled processing time to the decoding unit 82. The scheduling unit 85 according to the present embodiment is thus able to generate a schedule for efficiently operating the decoding unit 82 in comparison to a conventional scheduling unit, without allocating more scheduled processing time than necessary to the decoding unit 82.

Also, in FIG. 8, the scheduling unit 85 according to the present embodiment is able to perform scheduling so that the decoding process is performed on other user data, for the time (i.e., $T_1+T_2+T_3$) for which the decoding unit 82 is not reserved (secured) by the scheduling unit 85. Here, $T_1+T_2+T_3=1.2_{msec}+1.5_{msec}+1.5_{msec}=4.2_{msec}$. The scheduling unit 85 according to the present embodiment is thereby able to generate a schedule for efficiently operating the decoding unit 82.

Next, an operation of the scheduling unit 85 according to the above configuration will be described with reference to FIG. 9.

Figure 9:
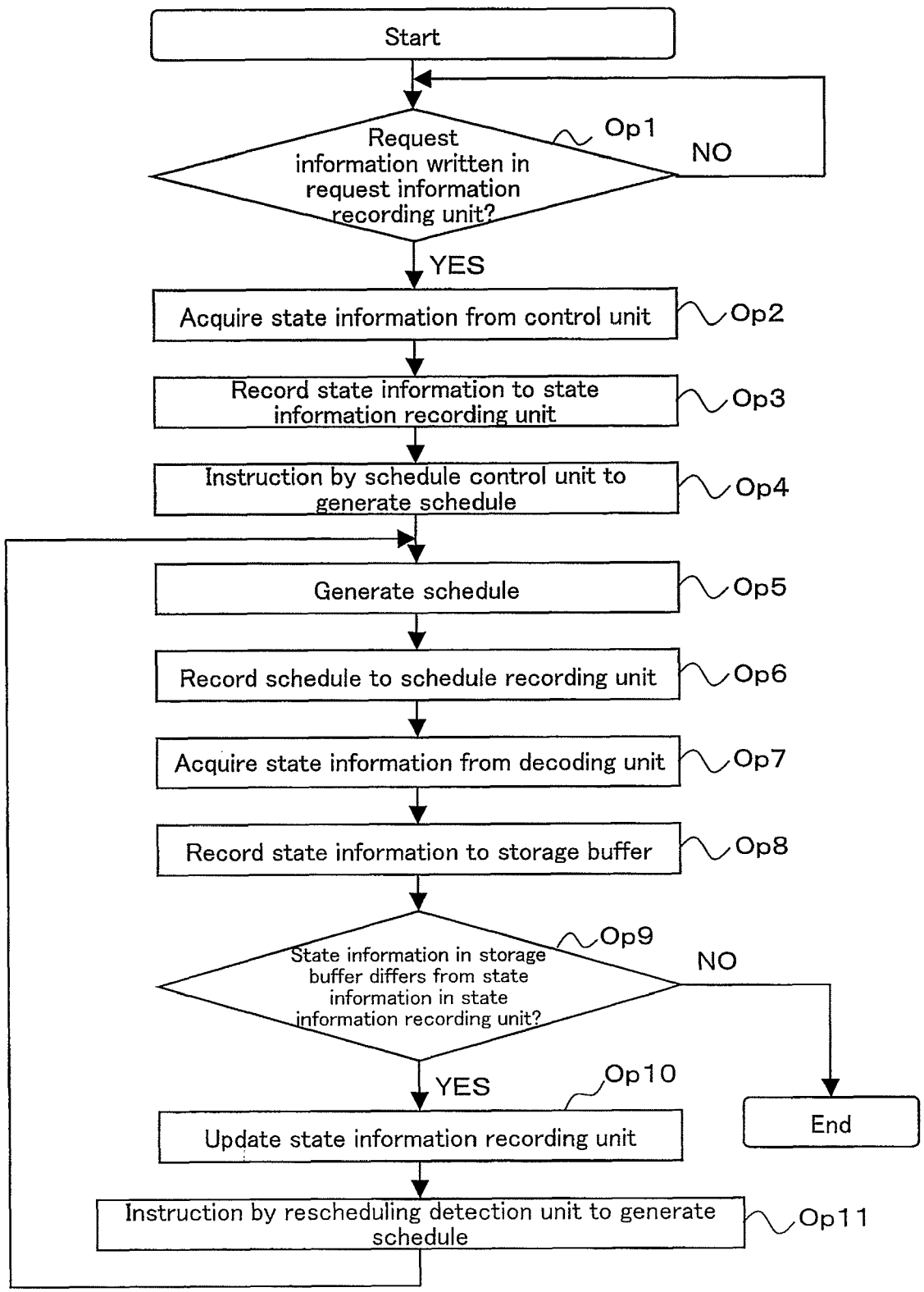
FIG. 9 is a flowchart illustrating an exemplary operation of the scheduling unit.

FIG. 9 is a flowchart illustrating an exemplary operation of the scheduling unit 85. As illustrated in FIG. 9, the schedule control unit 85b determines whether request information has been written in the request information recording unit 85a by the control unit 7 by periodically monitoring the request information recording unit 85a (Op1).

If it is determined that request information has been written in the request information recording unit 85a by the control unit 7 (YES at Op1), the schedule control unit 85b acquires the initial value of the TFCI, the initial value of the E-TFCI, and the maximum number of repetitions from the control unit 7 (Op2). Note that the initial value of the TFCI, the initial value of the E-TFCI, and the maximum number of repetitions serve as state information.

Here, the initial value of the TFCI acquired at Op2 is an identifier that serves as an indicator for computing the maximum amount of data for which the decoding unit 82 is able to perform the decoding process on first DCH data $U_d$. The initial value of the E-TFCI acquired at Op2 is an identifier that serves as an indicator for computing the maximum amount of data for which the decoding unit 82 is able to perform the decoding process on first EDCH data $U_e$. Further, the maximum number of repetitions acquired at Op2 is the maximum number of repetitions for which the decoding unit 82 is able to repeatedly perform the decoding process.

On the other hand, if it is determined that request information has not been written in the request information recording unit 85a by the control unit 7 (NO at Op1), the schedule control unit 85b returns to Op1 and repeats the determination process of Op1.

The schedule control unit 85b records the initial value of the TFCI, the initial value of the E-TFCI, and the maximum number of repetitions acquired at Op2 to the state information recording unit 85c (Op3). The schedule control unit 85b then instructs the schedule generation unit 85f to generate a first schedule for the decoding unit 82 (Op4).

The schedule generation unit 85f, if instructed at Op4, generates a first schedule for the decoding unit 82 with the above-mentioned method, with reference to the state information recording unit 85c, the data amount recording unit 85d and the processing time recording unit 85e (Op5). A first schedule is thereby generated by the schedule generation unit 85f, as illustrated in FIG. 10, for example. The schedule generation unit 85f records the first schedule generated at Op5 to the schedule recording unit 85g (Op6). The decoding unit 82 is thereby able to perform the decoding process on first DCH data $U_d$ and first EDCH data $U_e$, in accordance with the first schedule recorded in the schedule recording unit 85g. Note that in the present embodiment, the processing time actually required for the decoding unit 82 to perform the decoding process on the first DCH data $U_d$ and the first EDCH data $U_e$ is as illustrated in FIG. 11.

Next, the state information acquisition unit 85h acquires, from the decoding unit 82, state information (TFCI value, E-TFCI value, and repetition number information) that serves as an indicator for computing the processing time actually required for the decoding unit 82 to perform the decoding process on the first DCH data $U_d$ and the first EDCH data $U_e$ (Op7). The state information acquisition unit 85h records the state information acquired at Op7 to the storage buffer 85i (Op8).

The rescheduling detection unit 85j then determines whether the state information recorded in the storage buffer 85i differs from the state information recorded in the state information recording unit 85c (Op9). Specifically, the rescheduling detection unit 85j contrasts and compares the TFCI value, the E-TFCI value, and the number of repetitions recorded in the storage buffer 85i with the initial value of the TFCI, the initial value of the E-TFCI, and the maximum number of repetitions recorded in the state information recording unit 85c, and determines whether at least one of the TFCI values, the E-TFCI values, and the numbers of repetitions differ from one another.

If it is determined that the state information recorded in the storage buffer 85i differs from the state information recorded in the state information recording unit 85c (YES at Op9), the rescheduling detection unit 85j updates the initial value of the TFCI, the initial value of the E-TFCI, and the maximum number of repetitions recorded in the state information recording unit 85c to the TFCI value, the E-TFCI value, and the number of repetitions shown by the repetition number information recorded in the storage buffer 85i (Op10). On the other hand, if it is determined that the state information recorded in the storage buffer 85i does not differ from the state information recorded in the state information recording unit 85c (NO at Op9), the rescheduling detection unit 85j terminates the processing of FIG. 9.

The rescheduling detection unit 85j then instructs the schedule generation unit 85f to generate a second schedule for the decoding unit 82 (Op11). The processing then returns to Op5 and is repeated from Op5 onwards. That is, the schedule generation unit 85f, if instructed at Op11, generates a second schedule for the decoding unit 82 with the above-mentioned method, with reference to the state information recording unit 85c, the data amount recording unit 85d and the processing time recording unit 85e. The schedule generation unit 85f then records the generated second schedule to the schedule recording unit 85g.

The rescheduling detection unit 85j thus instructs the schedule generation unit 85f to again generate a schedule for the decoding unit 82 if the state information recorded in the storage buffer 85i differs from the state information recorded in the state information recording unit 85c. The schedule generation unit 85f generates a schedule for the decoding unit 82 whenever instructed by the rescheduling detection unit 85j to again generate a schedule for the decoding unit 82. The decoding unit 82 performs the decoding process on user data in accordance with the schedule generated by the schedule generation unit 85f.

Note that while an example in which the scheduling unit generates a schedule for a decoding unit (processing apparatus, decoding apparatus) was described above, the present invention is not limited to this. For example, the scheduling unit may generate a schedule for an encoding unit (processing apparatus) that performs an encoding process on user data.

Also, while an example in which the scheduling unit is provided in a radio base station apparatus was described above, the present invention is not limited to this. For example, the scheduling unit may be provided in an arbitrary device other than a radio base station apparatus, such as a radio terminal, a radio network controller, a personal computer or a server apparatus. In this case, the scheduling unit may generate a schedule for an arbitrary processing unit (processing apparatus) provided in the arbitrary device.

While the case where the radio base station apparatus and the radio network controller are, hardware-wise, respectively different apparatuses was described above, the present invention is not limited to this. That is, the radio base station apparatus and the radio network controller may, hardware-wise, be the same apparatus. In other words, the functions of the radio network controller may be provided in the radio base station apparatus.

While an example in which the schedule generation unit determines the processing time read out from a table recorded in a processing time recording unit as the scheduled processing time without modification was described above, the present invention is not limited to this. For example, the schedule generation unit may determine the scheduled processing time by adding or subtracting a correction value to or from a processing time read out from a table recorded in the processing time recording unit.

Further, while an example in which a plurality of tables are recorded in the processing time recording unit according to the number of repetitions was described above, the present invention is not limited to this. That is, a single table in which data amounts are recorded in association with processing times may be recorded in the processing time recording unit, regardless of the number of repetitions. In this case, the state information acquisition unit need not acquire repetition number information showing the number of repetitions for which the decoding unit actually performed the decoding process on user data from the decoding unit. In other words, the schedule generation unit reads out a data amount from the table recorded in the data amount recording unit, based on the TFCI value and the E-TFCI value, and reads out a processing time from the table recorded in the processing time recording unit, based on the read-out data amount.

That is, the present invention is not limited to the forgoing embodiment, and may be variously modified within the scope of the claims. In other words, an embodiment obtained through combining technical means appropriately modified within the scope of the claims is encompassed within the technical scope of the present invention.

As described above, the present invention is useful as a scheduling apparatus, a scheduling method or a computer program that enables a schedule for efficiently operating a processing apparatus to be generated, without allocating more scheduled processing time than necessary to the processing apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

The invention claimed is:

1. A scheduling apparatus capable of accessing a processing apparatus that performs a prescribed process on each of first processing target data and second processing target data, in order of the first processing target data and the second processing target data, the scheduling apparatus comprising:
   a schedule generating unit that generates a first schedule for the processing apparatus to perform the prescribed process on the first processing target data, by allocating, to the processing apparatus, a first scheduled processing time for which the processing apparatus is able to perform the prescribed process on the first processing target data, and records the generated first schedule to a schedule recording unit; and
   a state information acquisition unit that acquires, from the processing apparatus, state information that serves as an indicator for computing a processing time actually required for the processing apparatus to perform the prescribed process on the first processing target data in accordance with the first schedule recorded in the schedule recording unit, wherein
   the state information includes a data amount identifier that serves as an indicator for computing a data amount actually performed in the prescribed process on the first processing target data and repetition number information showing a number of repetitions for which the processing apparatus has actually performed the prescribed process on the first processing target data,
   the schedule generating unit computes the processing time actually required for the processing apparatus to perform the prescribed process on the first processing target data, based on the data amount identifier and the repetition number information included in the state information acquired by the state information acquisition unit, determines a second scheduled processing time for which the processing apparatus is able to perform the prescribed process on the second processing target data, based on the computed processing time, generates a second schedule for the processing apparatus to perform the prescribed process on the second processing target data, by allocating, to the processing apparatus, the determined second scheduled processing time, and records the generated second schedule to the schedule recording unit.

2. A scheduling apparatus capable of accessing a processing apparatus that performs a prescribed process on each of first processing target data and second processing target data, in order of the first processing target data and the second processing target data, the scheduling apparatus comprising:
   a schedule generating unit that generates a first schedule for the processing apparatus to perform the prescribed process on the first processing target data, by allocating, to the processing apparatus, a first scheduled processing time for which the processing apparatus is able to perform the prescribed process on the first processing target data, and records the generated first schedule to a schedule recording unit; and
   a state information acquisition unit that acquires, from the processing apparatus, state information that serves as an indicator for computing a processing time actually required for the processing apparatus to perform the prescribed process on the first processing target data, in a case where the processing apparatus has performed the prescribed process on the first processing target data in accordance with the first schedule recorded in the schedule recording unit, wherein
   the processing apparatus is a decoding apparatus that performs a decoding process on each of the first processing target data and the second processing target data, in order of the first processing target data and the second processing target data,
   the state information includes a data amount identifier that serves as an indicator for computing a data amount actually decoded by the decoding apparatus and repetition number information showing a number of repetition for which the processing apparatus has actually performed the decoding, in a case where the decoding apparatus has performed the decoding process on the first processing target data,
   the scheduling apparatus further comprises a processing time recording unit in which data amounts and processing times are recorded in association with one another, and
   the schedule generating unit computes the data amount actually decoded by the decoding apparatus, based on the data amount identifier, reads out a processing time from the processing time recording unit, based on the computed data amount and repetition number information, and computes the read-out processing time as the processing time actually required for the decoding apparatus to perform the decoding process on the first processing target data, determines a second scheduled processing time for which the processing apparatus is able to perform the prescribed process on the second processing target data, based on the computed processing time, generates a second schedule for the processing apparatus to perform the prescribed process on the second processing target data, by allocating, to the processing apparatus, the determined second scheduled processing time, and records the generated second schedule to the schedule recording unit.

3. A scheduling apparatus capable of accessing a processing apparatus which is a decoding apparatus that performs a prescribed process on each of first processing target data and second processing target data, in order of the first processing target data and the second processing target data, the scheduling apparatus comprising:

a schedule generating unit that generates a first schedule for the processing apparatus to perform the prescribed process on the first processing target data, by allocating, to the processing apparatus, a first scheduled processing time for which the processing apparatus is able to perform the prescribed process on the first processing target data, and records the generated first schedule to a schedule recording unit; and a state information acquisition unit that acquires, from the processing apparatus, state information that serves as an indicator for computing a processing time actually required for the processing apparatus to perform the prescribed process on the first processing target data, in a case where the processing apparatus has performed the prescribed process on the first processing target data in accordance with the first schedule recorded in the schedule recording unit, wherein the decoding apparatus performs error detection on a decoding result of the decoding process, and outputs the decoding result if an error is not detected in the decoding result, and feeds back the decoding result and repeats the decoding process again if an error is detected in the decoding result, the state information includes a data amount identifier that serves as an indicator for computing a data amount actually decoded by the decoding apparatus, in a case where the decoding apparatus has performed the decoding process on the first processing target data and repetition number information showing a number of repetitions for which the decoding apparatus has actually performed the decoding process on the first processing target data, the processing time recording unit has recorded therein numbers of repetitions, data amounts and processing times in association with one another, and the schedule generating unit computes the data amount actually decoded by the decoding apparatus, based on the data amount identifier, reads out a processing time from the processing time recording unit, based on the computed data amount and the number of repetitions shown by the repetition number information, and computes the read-out processing time as the processing time actually required for the decoding apparatus to perform the decoding process on the first processing target data, determines a second scheduled processing time for which the processing apparatus is able to perform the prescribed process on the second processing target data, based on the computed processing time, generates a second schedule for the processing apparatus to perform the prescribed process on the second processing target data, by allocating, to the processing apparatus, the determined second scheduled processing time, and records the generated second schedule to the schedule recording unit.

4. The scheduling apparatus according to claim 1, wherein the first processing target data and the second processing target data are user data transmitted from a radio terminal using a DCH (Dedicated Channel) or user data transmitted from a radio terminal using an E- DCH (Enhanced DCH).

5. A radio base station apparatus comprising the scheduling apparatus of claim 1.

6. A scheduling method according to which processing is executed by a computer capable of accessing a processing apparatus that performs a prescribed process on each of first processing target data and second processing target data, in order of the first processing target data and the second processing target data, the scheduling method comprising:

a schedule generating step of generating a first schedule for the processing apparatus to perform the prescribed process on the first processing target data, by allocating, to the processing apparatus, a first scheduled processing time for which the processing apparatus is able to perform the prescribed process on the first processing target data and recording the first schedule to a schedule recording unit; and a state information acquiring step of acquiring, from the processing apparatus, state information that serves as an indicator for computing a processing time actually required for the processing apparatus to perform the prescribed process on the first processing target data in accordance with the first schedule recorded in the schedule recording unit, wherein the state information includes a data amount identifier that serves as an indicator for computing a data amount actually performed in the prescribed process on the first processing target data and repetition number information showing a number of repetitions for which the processing apparatus has actually performed the prescribed process on the first processing target data, in the schedule generating step, the processing time actually required for the processing apparatus to perform the prescribed process on the first processing target data is computed based on the data amount identifier and the repetition number information included in the state information acquired in the state information acquiring step, a second scheduled processing time for which the processing apparatus is able to perform the prescribed process on the second processing target data is determined based on the computed processing time, and a second schedule for the processing apparatus to perform the prescribed process on the second processing target data is generated by allocating, to the processing apparatus, the determined second scheduled processing time, and recorded to the schedule recording unit.

7. A non-transitory program recording medium having recorded thereon a program for causing a computer capable of accessing a processing apparatus that performs a prescribed process on each of first processing target data and second processing target data, in order of the first processing target data and the second processing target data, to execute processing, the program causing the computer to execute:

a schedule generating process of generating a first schedule for the processing apparatus to perform the prescribed process on the first processing target data, by allocating, to the processing apparatus, a first scheduled processing time for which the processing apparatus is able to perform the prescribed process on the first processing target data; and a state information acquiring process of acquiring, from the processing apparatus, state information that serves as an indicator for computing a processing time actually required for the processing apparatus to perform the prescribed process on the first processing target data in accordance with the first schedule, wherein in the schedule generating process, the processing time actually required for the processing apparatus to perform the prescribed process on the first processing target data is computed based on the data amount identifier and the repetition number information included in the state information acquired in the state information acquiring process, a second scheduled processing time for which the processing apparatus is able to perform the prescribed process on the second processing target data is determined based on the computed processing time, and a second schedule for the processing apparatus to perform the prescribed process on the second processing target data is generated by allocating, to the processing apparatus, the determined second scheduled processing time.

8. A scheduling method according to which processing is executed by a computer capable of accessing a processing apparatus that performs a prescribed process on each of first processing target data and second processing target data, in order of the first processing target data and the second processing target data, the scheduling method comprising:

a schedule generating step of generating a first schedule for the processing apparatus to perform the prescribed process on the first processing target data, by allocating, to the processing apparatus, a first scheduled processing time for which the processing apparatus is able to perform the prescribed process on the first processing target data; and a state information acquiring step of acquiring, from the processing apparatus, state information that serves as an indicator for computing a processing time actually required for the processing apparatus to perform the prescribed process on the first processing target data in accordance with the generated first schedule, wherein in the schedule generating step, the processing time actually required for the processing apparatus to perform the prescribed process on the first processing target data is computed based on the data amount identifier and the repetition number information included in the state information acquired in the state information acquiring step, a second scheduled processing time for which the processing apparatus is able to perform the prescribed process on the second processing target data is determined based on the computed processing time, and a second schedule for the processing apparatus to perform the prescribed process on the second processing target data is generated by allocating, to the processing apparatus, the determined second scheduled processing time.

* * * * *